United States Patent [19]
Daniel

[11] Patent Number: 5,104,541
[45] Date of Patent: Apr. 14, 1992

[54] OIL-WATER SEPARATOR

[76] Inventor: William H. Daniel, 121 Tulsa Dr., Rogers, Ark. 72756

[21] Appl. No.: 605,089

[22] Filed: Oct. 31, 1990

Related U.S. Application Data

[62] Division of Ser. No. 521,565, May 10, 1990.

[51] Int. Cl.$^5$ .............................................. C02F 1/38
[52] U.S. Cl. ............................. 210/512.3; 210/512.1;
  415/182.1; 415/203; 415/206; 415/207;
  416/179; 416/182; 416/105; 416/108;
  417/423.14
[58] Field of Search ............... 415/182.1, 203, 206,
  415/207; 416/179, 182, 185, 188; 417/423.14;
  210/512.1, 512.3, 360.1; 209/144, 211

[56] References Cited

U.S. PATENT DOCUMENTS

| | | | |
|---|---|---|---|
| 3,261,297 | 7/1966 | Daniel | 415/204 |
| 4,136,018 | 1/1979 | Clark et al. | 210/512.1 |
| 4,312,751 | 1/1982 | Casamitjana | 210/512.1 |
| 4,470,902 | 9/1984 | Yoshimori | 209/144 |
| 4,478,712 | 10/1984 | Arnaudeau | 210/512.3 |
| 4,597,859 | 7/1986 | Beck | 210/512.3 |
| 4,702,837 | 10/1987 | Leoffre et al. | 210/512.3 |

Primary Examiner—Robert A. Dawson
Assistant Examiner—David Reifsnyder
Attorney, Agent, or Firm—Young & Thompson

[57] ABSTRACT

A pump has an impeller with a circular series of airfoil vanes rigidly mounted thereon. The impeller is mounted in a casing which has a radially outwardly increasing internal axial extent, such that fluid flowing through the pump has a less constricted path peripherally of the pump chamber than centrally of the pump chamber. In another aspect of the invention, the impeller comprises two axially adjacent series of vanes separated by a radially extending partition which divides the interior of the pump casing into a vacuum chamber and a pressure chamber interconnected by a hole formed in the center of the partition. At least one of the central partition and the impeller plate are conical in shape, thereby to impart a radially outwardly expanding axial extent to the vacuum chamber, and a decreasing axial extent to the pressure chamber. By providing a pair of outlets communicating with the vacuum and pressure chambers, there is provided a pump which is effective to separate a mixture of liquid components having different densities.

7 Claims, 4 Drawing Sheets

OIL-WATER SEPARATOR

This application is a division of application Ser. No. 07/521,565, filed May 10, 1990.

The present invention relates to pumps, more particularly of the centrifugal type, in which a series of spaced vanes moves in a circular path and fluid enters at a point within the circular path and moves outward through the revolving vanes and leaves the pump at a point outside the circular path.

The present invention is an improvement on and a departure from the pump disclosed in U.S. Pat. No. 3,261,297 to the same inventor, the entirety of which patent is hereby expressly incorporated by reference to the extent not inconsistent herewith.

Conventional centrifugal pumps comprise an impeller bearing the vanes, which impeller is rotated about an axis and is received in a chamber having a central inlet and a peripheral outlet for the pumped fluid. When viewed in section along a sectional plane containing the axis of rotation of the impeller, the internal axial extent of the pump chamber in most conventional centrifugal pumps decreases radially outwardly from the center of the pump chamber to the periphery. This is so the water can gain speed and pressure as it is spun away from the axis of the pump, thereby to achieve the desired head pressure.

In other pumps, such as in dishwashers and laundry machines for domestic use where efficiency is less important but size is a significant consideration, the pump chamber is substantially constant in cross-sectional area. This is also so of the earlier U.S. Pat. No. 3,261,297 of the present inventor.

In U.S. Pat. No. 2,430,552 to Bernal, FIG. 1 shows a suction pump of the first type described above, in which the internal axial extent of the pump decreases radially outwardly of the impeller, whereas FIG. 2 shows a pump of the second type, where the convex right-hand side of the pump chamber is more than offset by the concave left-hand side of the chamber, thereby to give a pump chamber whose internal axial extent is substantially constant radially of the impeller.

In has now been most surprisingly discovered that performance of centrifugal pumps is dramatically improved by provision of a pump chamber whose internal axial extent increases radially outwardly of the impeller. In conventional pumps, as the path of the water narrows as it flows away from the pump axis it builds up pressure and thus also back pressure. It is this back pressure that is the limiting factor in conveying liquid through the pump at full force. According to the present invention, this back pressure is significantly reduced by a pump whose internal axial extent progressively increases radially outwardly of the impeller over the majority of the radial extent of the pump chamber, so that the water has room in which to expand rather than create back pressure.

The pump in accordance with the present invention may be identified as a Liquid Conveying Device, or LCD.

In preferred embodiments of the invention, the vanes on the impeller within the radially outwardly expanding chamber are of airfoil configuration, as in the inventor's earlier U.S. Pat. No. 3,261,297.

It has also now been discovered that the principle of this novel pump construction as described above may be used to provide a duplex pump for separating liquid components of different densities from a mixture, and especially for separating oil and water. The duplex pump comprises the vacuum pump as previously described as a vacuum chamber, and a conventional pressure pump chamber axially adjacent thereto. Indeed, in a preferred embodiment of the duplex pump, the impeller structure may serve simultaneously to define a radially outwardly expanding internal axial extent of the vacuum side and a radially outwardly decreasing axial extent of the pressure side, while being received in a pump casing which is itself cylindrical.

Other objects and advantages of the present invention will become apparent from a consideration of the following description, taken in connection with the accompanying drawings, in which.

Figure 1:
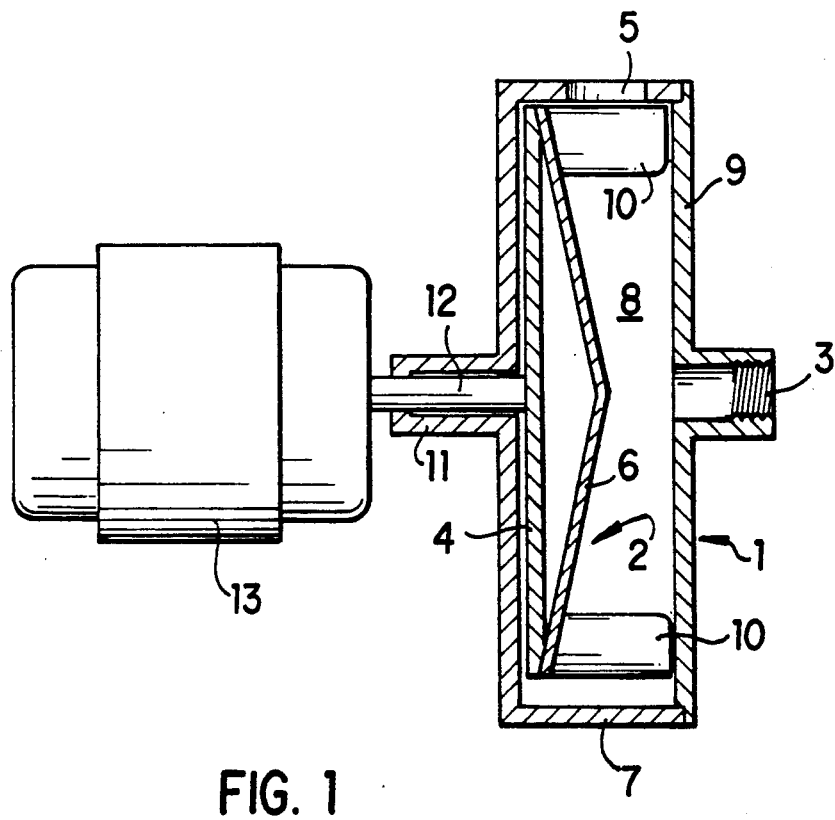
FIG. 1 is a partial sectional view of a pump according to a less preferred embodiment of the invention.

Referring now to the drawings in greater detail, and first with reference to the less preferred embodiment of FIG. 1, it will be seen that there is provided a pump of the centrifugal type, comprising a generally cylindrical casing 1 having a threaded central inlet 3 and a peripheral outlet 5. The outlet 5 is preferably in communication with an outlet pipe (not shown) formed with the casing 1 and extending tangentially therefrom. The casing 1 is composed of two principal parts, a body part 7 and a cover plate 9 comprising the central inlet 3, which cover plate 9 may be secured to the body part 7 by means of bolts or the like.

The body part 7 of casing 1 is generally cup-shaped and comprises the peripheral outlet hole 5, as well as a bearing 11 for receiving the motor shaft 12.

Received for rotation within the casing 1 is an impeller 2 which comprises an impeller plate 4 substantially coextensive with the back wall of the pump casing 1. Rigidly secured to the impeller plate 4 in this embodiment is a conical plate 6 which defines with the interior of the pump casing 1 a radially outwardly expanding internal volume 8.

Attached to the impeller 2 are a plurality of airfoil vanes 10, such as those described in the inventor's earlier U.S. Pat. No. 3,261,297. Although only two such airfoils 10 are depicted in FIG. 1, it will be understood that in practice at least three and advantageously four or more such airfoils 10 are regularly distributed over the periphery of the conical plate 6, with their leading edges all directed in the same direction about the circle. In this embodiment the airfoils 10 are shown connected to the conical plate 6, but it will be understood that the airfoils 10 could also be connected directly to the impeller plate 4, with the conical plate 6 in that case being of lesser diameter than the impeller plate 4, and extending up to the airfoils 10.

The impeller 2 also comprises threading by which it is attached to a motor shaft 12 extending into the pump casing within the bearing 11. A sealing gasket assembly and anti-friction bearings, not shown in FIG. 1, may of course also be provided between the motor shaft 12 and journal 11, to ensure smooth and fluid tight functioning of the pump unit.

Figure 2:
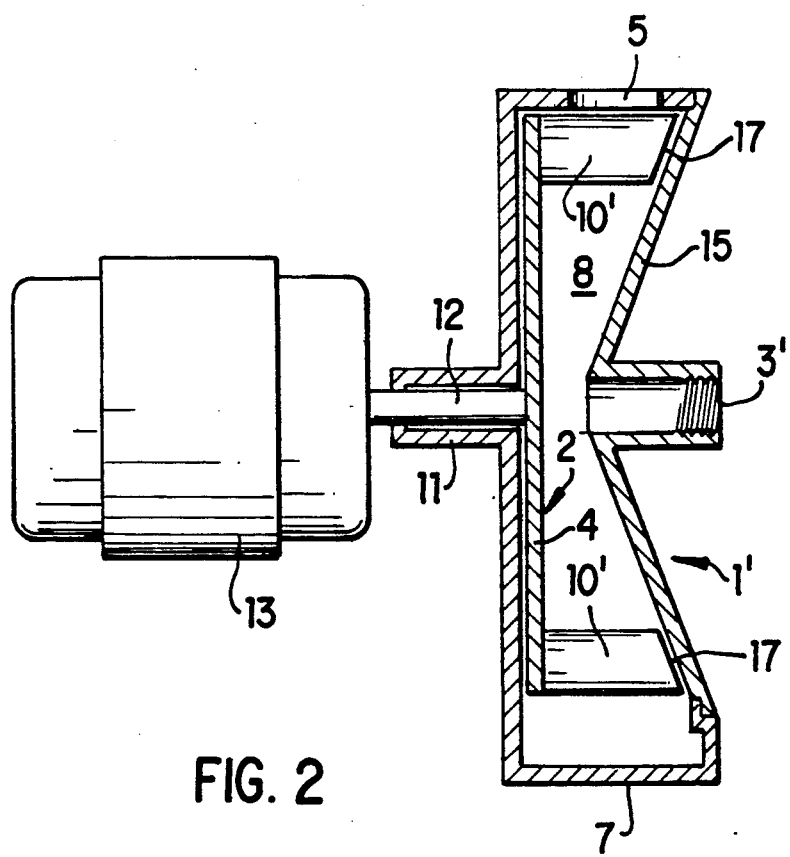
FIG. 2 is a partial sectional view of a pump according to a more preferred embodiment of the invention.

The more preferred embodiment of FIG. 2 differs from the less preferred embodiment of FIG. 1 in that the conical plate 6 is omitted, and the cover 9 is replaced by a conical cover 15, which imparts to the internal volume 8 of the thus-modified casing 1' the requisite radially outwardly expanding volume. Note also in this embodiment that the airfoil vanes 10' may in this case have angled top portions 17, corresponding to the interior surface of the cover 15.

In operation, the source of liquid is coupled by a pipe connection to the inlet 3 of casing 1, and motor 13 is turned on. Rotation of motor 13 causes impeller shaft 12 to rotate at the output r.p.m. of motor 13. As the series of airfoil vanes 10, 10' begins to rotate about the axis of rotation of the impeller 2, a lift is generated on the radially inwardly directed surfaces of the airfoils, in the classical manner. This lift in turn promotes a decreased pressure which attracts liquid in through inlet 3 and radially outwardly toward the airfoils 10, 10' and ultimately through the outlet hole 5. Travel of the liquid radially outwardly of the pump chamber 8 is also promoted by the centrifugal force imparted to the liquid by the spinning impeller 2.

Because the liquid has an increased axial extent in which to expand as it travels radially outwardly of the pump chamber, the pump runs more quietly and with less pulse. A pump in accordance with the embodiment shown in FIG. 2 was constructed, and was found to require just over 6 amps of power input to produce the same flow rate through the outlet 5 as for a pump identical in all respects except having a constant cross-sectional area within the pump chamber, which conventional pump required 17 amps of power input to produce the same output flow rate.

Figure 3:
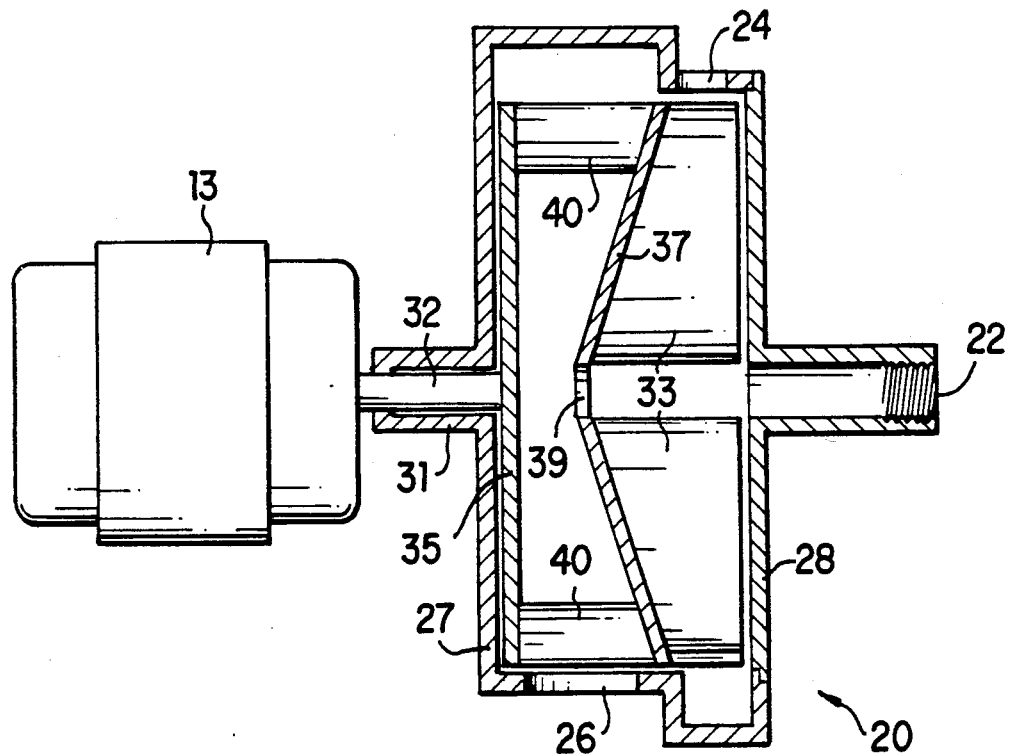
FIG. 3 is a partial sectional view of a duplex liquid-separating pump according to a more preferred embodiment of the invention.
Figure 4:
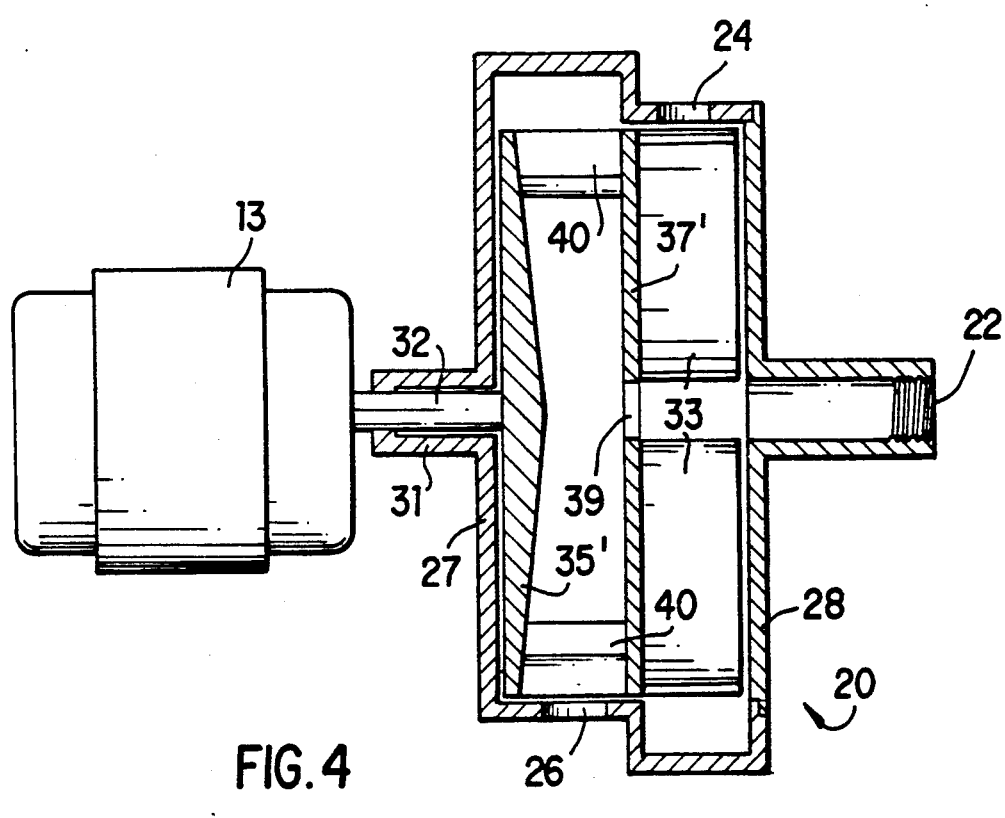
FIG. 4 is a partial sectional view of a duplex fluid-separating pump according to a less preferred embodiment of the invention.

According to another aspect of the invention, the vacuum pump is incorporated in a novel oil-water separator, two embodiments of which are shown in FIGS. 3 and 4. Although these embodiments will be described hereinafter with reference to an oil-water separator, it will of course be appreciated that the separator is effective also to separate any mixture of two or more liquids having a sufficient difference in density.

In the more preferred embodiment of FIG. 3, it will be seen that there is provided a cylindrical casing 20 having a central inlet 22 and first and second peripheral outlets 24 and 26 offset relative to one another axially of the casing 20. Casing 20 is generally comprised of two principal separable portions by which access may be had to the interior of the pump chamber. One of those portions is a cover 28 comprising a central inlet 22, and the other is a generally cup-shaped body portion 27 comprising the peripheral outlets 24 and 26, as well as a bearing 31 for rotatably housing an impeller shaft 32 connected to a motor 13, in a manner similar to the embodiments of FIGS. 1 and 2.

The impeller structure of the embodiment of FIG. 3 substantially completely fills the cylindrical interior of casing 20, and divides the interior of casing 20 into two axially adjacent chambers, a convex vacuum chamber and a concave pressure chamber. The convex vacuum chamber is delimited by the impeller plate 35 (which as in the previous embodiments is substantially coextensive with the back wall of the body portion 27 of casing 20) and conical partition 37, the impeller plate 35 and conical partition 37 being in this embodiment rigidly interconnected by the circular array of airfoil vanes 40. As before, although only two such airfoils 40 are depicted in FIG. 3, it will be appreciated that the number of airfoils 40 in practice will be at least three and preferably four or more, equally spaced in a circular array mounted on the peripheries of the impeller plate 35 and conical partition 37, with their leading edges facing in the same direction in the circle. The conical partition 37 is provided with a central opening 39, for placing the front and rear halves of the pump in liquid communication.

The concave pressure chamber is delimited by the other side of the conical partition 37, and the cover 28 of casing 20. Rigidly mounted on that side of partition 37 facing the pressure chamber, is a series of paddle-shaped vanes 33, which extend radially from the central hole 39 of the partition 37 substantially to the periphery thereof, and axially from the partition 37 to just short of the interior surface of the front wall 20.

Figure 5:
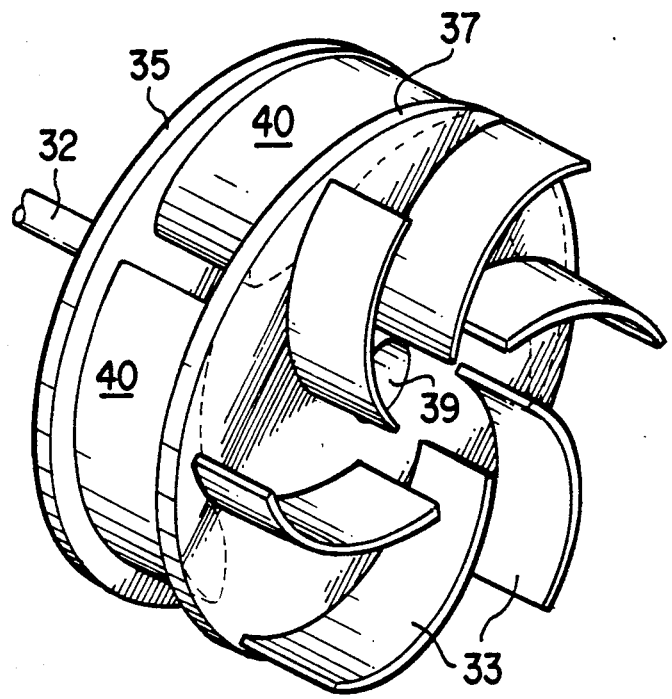
FIG. 5 is a perspective view of an impeller suitable for use in a duplex pump according to the invention.

The structure of the impeller in the embodiment of FIG. 3 will be better understood from the perspective view of FIG. 5, in which it will be seen that each of the arcuate paddle-shaped vanes 33 describes a helix originating at the center of the conical partition 37.

The structure of the impeller plate 35 with airfoils 40 attached thereto, as in the embodiment of FIGS. 1 and 2, may be identical to the impeller structure described in the inventor's earlier U.S. Pat. No. 3,261,297.

Although the impeller structure of FIG. 5 is shown as having six paddle-shaped vanes 33, it will be appreciated that any number of vanes of three or more is suitable.

With reference again to FIG. 3, the operation of the oil-water separator pictured therein is as follows. The inlet 22 of casing 20 is connected to an oil-water mixture, for example via a flexible conduit to a body of water contaminated with crude oil spilled from a ruptured tanker. The motor 13 is then actuated, thereby spinning in unison, via the impeller shaft 32, the assembly composed of impeller plate 35, conical partition 37 connected thereto via airfoils 40, and paddle-shaped vanes 33 fixed to the other side of the conical partition 37. Oil-water mixture is then sucked into the interior of casing 20 through inlet 22 by the action of the rotating vanes 33 and airfoils 40, which urge the liquid radially outwardly of the casing. At the same time, the radially outwardly decreasing axial extent of the concave pressure chamber creates an increasing pressure extending radially outwardly of the pressure chamber, whereas the radially outwardly increasing axial extent of the convex vacuum chamber creates a progressively increasing suction extending radially outwardly of the convex vacuum chamber. These respective pressure and vacuum effects created in the axially adjacent chambers are further accentuated by the respective geometry of the paddle-shaped vanes 33 in the pressure chamber and the airfoils 40 in the vacuum chamber.

There is thus created a pressure gradient within the pump casing 20, such that immediately upon being filled with oil-water mixture, the denser water component fills the pressure side of the separator, whereas the less dense oil component migrates to the vacuum side of the pump through the central hole 39 provided in conical partition 37. Passage of the less dense oil component within the pressure chamber toward the outlet 24 is thereafter prevented not only by the existing pressure gradient, but also by the denser water component filling the pressure chamber and providing a physical barrier to passage of the less dense oil component therethrough.

The respective oil and water components of the oil-water mixture are thereby simultaneously separated from one another, and impelled radially outwardly of the pump casing 20, the less dense oil component being discharged through the outlet 26, and the more dense water component being discharged through the outlet 24.

It has been found in practice, using an oil-water separator constructed according to the embodiment of FIG. 3, that a separation of oil and water can be effected which is practically complete, using an advantageously low power input to the motor 13.

FIG. 4 of the accompanying drawings shows a less preferred version of the oil-water separator. The casing 20 in this embodiment is identical to that of the embodiment of FIG. 3, with the difference being in the structure of the impeller. Specifically, in the embodiment of FIG. 4, the impeller plate 35' is conical, thereby imparting to the vacuum chamber of the separator the requisite radially outwardly increasing axial extent. Because the impeller plate 35' of this embodiment is conical, the partition 37' need not be conical and may be formed as a substantially flat circular disk having a central hole 39, as shown in section in FIG. 4. In accordance therewith, the paddle-shaped vanes 33 in the embodiment of FIG. 4 do not taper radially outwardly as do those of the embodiment of FIG. 3, but rather are constant in height. It will accordingly be appreciated that in the embodiment of FIG. 4, the pressure increase as the denser component travels radially outwardly within the pressure side of the chamber is caused solely by the centrifugal force of the rotating impeller and the fluid impelled thereby, and is not accentuated by any radially outwardly decreasing extent on the pressure side of the chamber. Nonetheless, the necessary pressure gradient between the vacuum and pressure sides of the pump in FIG. 4 is achieved, such that a good separation of the components of different densities may be attained.

Figure 6:
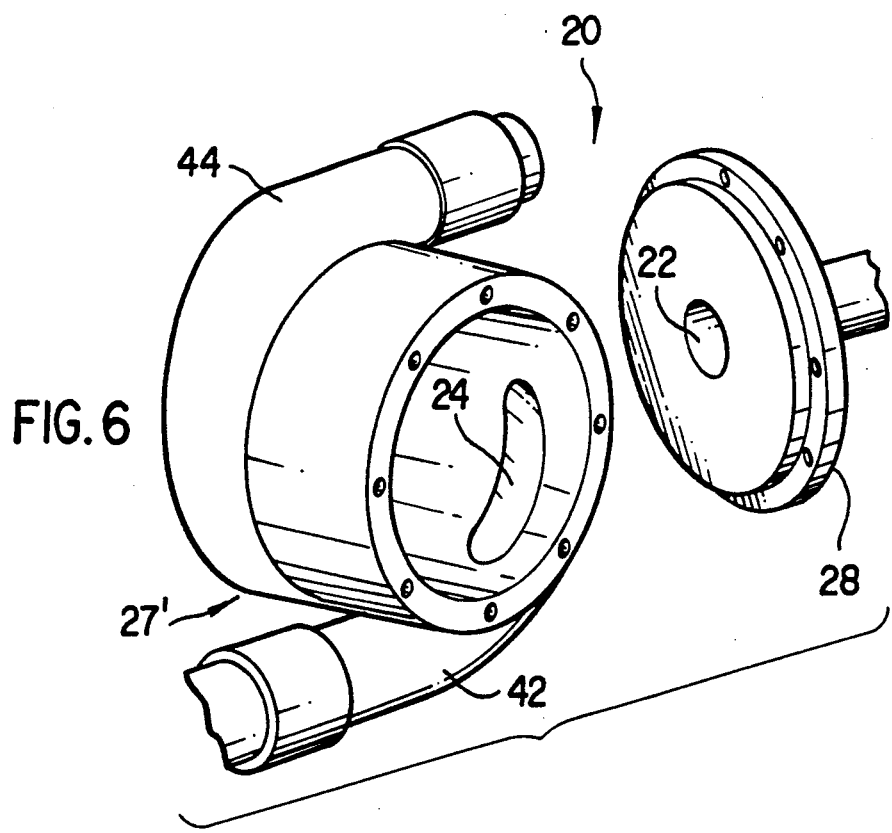
FIG. 6 is a perspective view of a pump casing in which the impeller of FIG. 5 may be received.

FIG. 6 of the accompanying drawings shows in perspective a variation of a casing 20 suitable for use in either of the embodiments of FIGS. 3 and 4. In this figure, the casing 20 comprises a casing body 27 having integral therewith tangentially disposed outlet pipes 42, 44, communicating with the respective outlet holes 24, 26 of the pressure and vacuum chambers, respectively.

Figure 7:
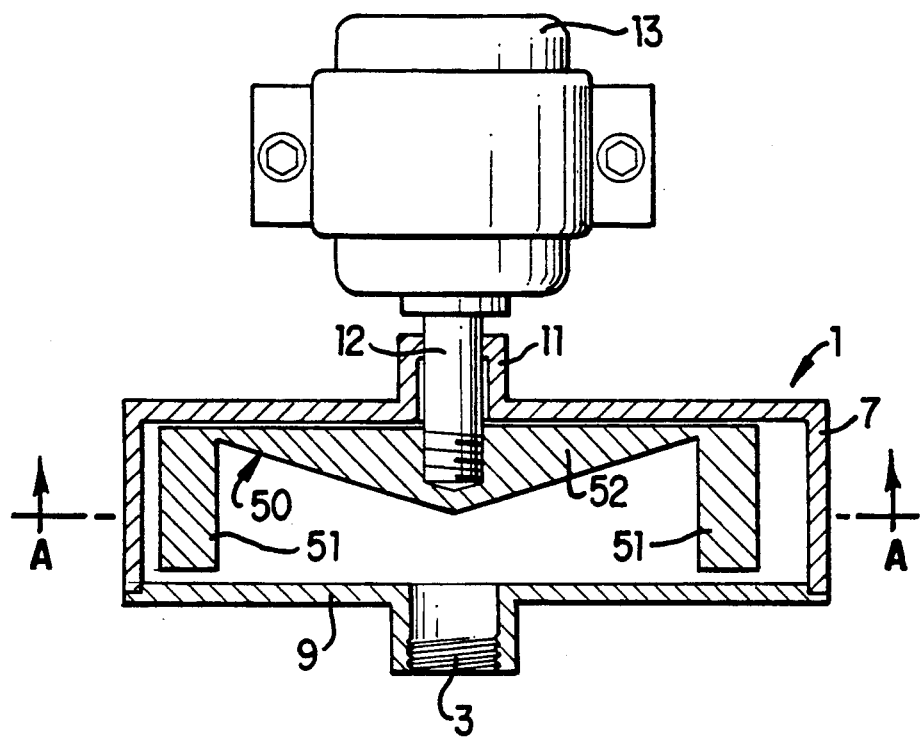
FIG. 7 is a partial axial sectional view of a pump according to a further embodiment of the invention, taken along the line B—B of FIG. 8.
Figure 8:
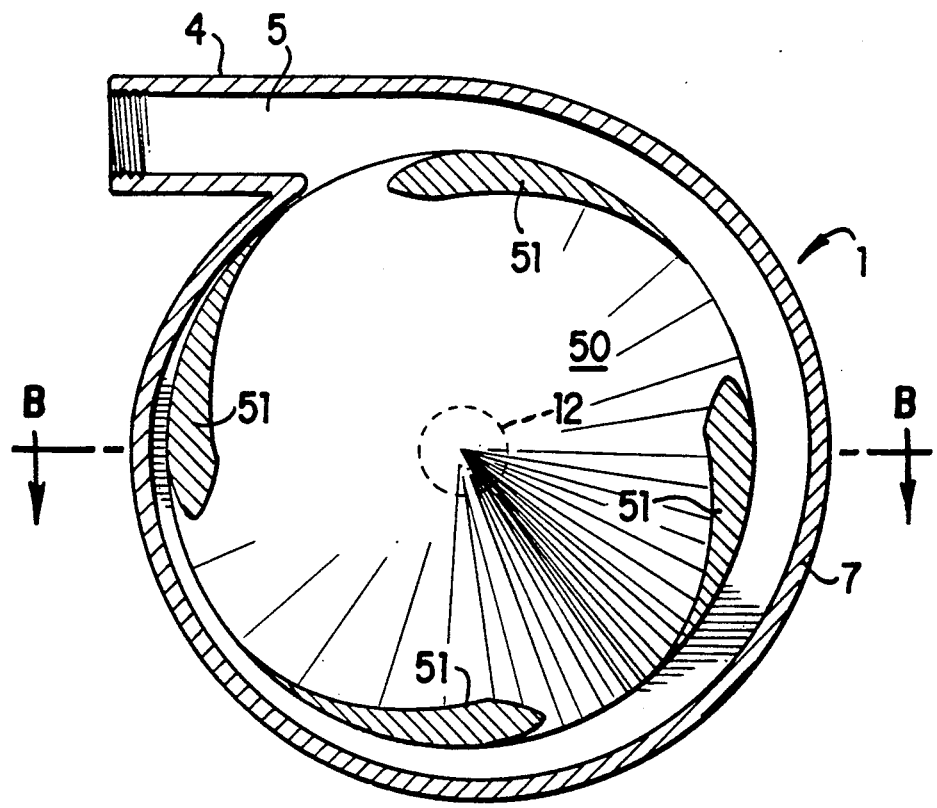
FIG. 8 is a partial radial sectional view of the pump of FIG. 7, taken along the line A—A of FIG. 7.

FIGS. 7 and 8 of the accompanying drawings show a further embodiment of the pump according to the invention. It will be appreciated that this embodiment is substantially the same as that pictured in FIG. 1 of the drawings, with like reference numerals being used to designate like parts.

In this embodiment, however, the impeller 50 is of one-piece construction, such that the conical impeller plate 52 is formed integrally with the airfoil vanes 51. The one-piece construction for the impeller 50 shown in FIGS. 7 and 8 is believed to be more durable and less costly than impeller constructions formed of plural elements assembled together. In addition, this one-piece construction can be provided on the backside of the impeller plate 52 with a threaded hole to receive the threaded end of the motor shaft 12, as shown in FIG. 7.

The radial sectional view of FIG. 8 shows the circumferentially increasing volume of the pump volute, which promotes improved flow of liquid through the pump. It will be appreciated that in the embodiments of FIGS. 3 and 4, relating to the duplex fluid-separating pump, both the pressure and vacuum chambers are provided with a similar increasing volute, for providing additional volume radially outwardly of the blades and airfoils, to promote fluid flow.

Although the present invention has been described in connection with various preferred embodiments thereof, it will be appreciated that modifications thereof remain possible without departing whatsoever from the scope and spirit of the appended claims. For example, in the embodiment of FIG. 2, not only the cover 15 of casing 1' but also the back wall of the body portion 7 could be an inwardly directed conical configuration, thereby to provide a doubly convex pump chamber 8. Similarly, in the embodiment of FIG. 3, the back wall of the body 27 of pump chamber 20, as well as the impeller plate 35, could be inwardly conical. Moreover, in FIG. 4, the flat partition 37' could be replaced by the conical partition 37 of FIG. 3, thereby to provide a doubly convex vacuum chamber in the oil-water separator.

What is claimed is:

1. A pump for separating a mixture of two or liquid components having different densities, comprising a pump casing defining a pump chamber and having an inlet and two outlets, and an impeller disposed in the pump chamber and rotatable relative to said pump chamber about an axis; said impeller comprising: an impeller plate disposed adjacent one wall of the casing, a partition having a central hole and dividing said pump chamber into axially adjacent vacuum and pressure chambers, a first series of vanes interconnecting the impeller plate and the partition and a second series of vanes mounted on said partition on a side thereof opposite the first series of vanes; the inlet being disposed centrally of the path of the first and second series of vanes and the two outlets being disposed outside the paths of the first and second series of vanes, one of the two outlets communicating with the pressure chamber and the other of the two outlets communicating with the vacuum chamber, said vanes being so configured as to impel fluid radially outwardly of said casing upon rotation of said impeller, said vacuum chamber having a radially outwardly increasing internal axial extent over a majority of the radial extent of the pump casing, whereby fluid travelling through said vacuum chamber has a less constricted path peripherally of the vacuum chamber than centrally of the vacuum chamber.

2. The pump according to claim 1, wherein the partition is conical and comprises a central hole, thereby to define a said vacuum chamber of radially outwardly increasing axial extent and a said pressure chamber of radially outwardly decreasing axial extent.

3. The pump according to claim 1, wherein said first series of vanes is of airfoil configuration, and said second series of vanes is of paddle-shaped configuration.

4. The pump according to claim 1, wherein the pump chamber comprises a cup-shaped portion receiving the impeller and a cover plate closing the cup-shaped portion.

5. The pump according to claim 1, wherein the impeller plate is conical, with the base of the cone being at the periphery of the impeller plate and the tip of the cone at the center of the impeller plate, thereby to define a vacuum chamber of progressively radially outwardly increasing axial extent.

6. The pump according to claim 5, wherein the partition is a substantially planar circular disk provided with said central hole.

7. The pump according to claim 1, wherein the impeller comprises an impeller shaft extending outside the pump casing and mounted for rotation therein, the pump further comprising a motor in driving connection with the impeller shaft.

* * * * *